United States Patent [19]
Fryda et al.

[11] Patent Number: 4,807,201
[45] Date of Patent: Feb. 21, 1989

[54] GROUNDWATER PRESSURE MEASUREMENT

[75] Inventors: Lawrence J. Fryda, Bloomington; John W. Foster, Normal, both of Ill.

[73] Assignee: Illinois State University, Normal, Ill.

[21] Appl. No.: 173,281

[22] Filed: Mar. 25, 1988

[51] Int. Cl.4 .......................... G01S 13/08; G01S 15/08
[52] U.S. Cl. ......................................... 367/99; 367/908
[58] Field of Search .................. 367/99, 908; 181/124; 340/621; 73/290 V, 151

[56] References Cited

U.S. PATENT DOCUMENTS

| | | | |
|---|---|---|---|
| 2,232,476 | 2/1941 | Ritzmann | 73/155 |
| 2,713,263 | 7/1955 | Turner | 73/290 V |
| 3,394,589 | 7/1968 | Tomioka | 73/290 V |
| 3,834,233 | 9/1974 | Willis | 73/290 V |
| 4,090,407 | 5/1978 | Shuler | 73/290 V |
| 4,170,765 | 10/1980 | Austin | 367/100 |
| 4,318,298 | 3/1982 | Godbey | 73/290 V |
| 4,461,172 | 7/1984 | McKee | 73/155 |
| 4,523,465 | 6/1985 | Fasching | 367/908 |

Primary Examiner—Thomas H. Tarcza
Assistant Examiner—Daniel T. Pihulic
Attorney, Agent, or Firm—Samuels, Miller, Schroeder, Jackson & Sly

[57] ABSTRACT

An apparatus measures changes in groundwater pressure in a borehole. The apparatus comprises: a probe consisting of a hollow tube having a smooth interior surface, an ultrasonic transmitter which emits ultrasonic waves down the interior of the tube, and an ultrasonic receiver which receives and registers the reflected ultrasonic waves; a means to raise and lower the probe so the tube is partially submerged in the groundwater; a means to control the emission of ultrasonic waves; a means to convert the time interval into a distance or pressure measurement; and a means to store or transmit the data.

3 Claims, 1 Drawing Sheet

GROUNDWATER PRESSURE MEASUREMENT

FIELD OF THE INVENTION

This invention relates to the measurement of groundwater pressure. More particularly, this invention relates to an apparatus for, and a method of, measuring changes in groundwater pressure over variable time intervals.

BACKGROUND OF THE INVENTION

Groundwater is water located under the Earth's surface. It is widely considered to be the most precious of all geologic resources. A large percentage of the Earth's population is dependent upon groundwater for drinking, irrigation, and/or industrial purposes. Fortunately, there is far more groundwater than water in all the world's rivers and lakes.

Groundwater occurs in the pores and fractures of rock and sediment. Although water contained in some materials is largely immobile, water contained in other materials is capable of migration in response to a pressure gradient and can be extracted by drilling. Such reservoirs of groundwater are often called aquifers. Water in most fresh-water aquifers has natural movement irrespective of any artificial withdrawals. This movement of groundwater has special significance in connection with groundwater contamination. When groundwater becomes contaminated at one place, the contamination tends to move to other places by transport down the hydraulic gradient. Accordingly, a contaminant source (e.g., a landfill or an accidental spill of a hazardous liquid) can be a threat to persons living great distances away who rely upon uncontaminated groundwater.

The science of geohydrology primarily addresses the physical occurrence of aquifers and the nature of groundwater dynamics—the complex flow systems in the subsurface. The principal controlling parameter in groundwater dynamics is the fluid pressure, specifically, the differences in fluid pressure in three dimensions. In accordance with Darcy's Law, groundwater migrates from high pressure to low pressure, quantitatively mitigated by: (1) the hydraulic gradient; (2) the hydraulic conductivity of the geologic medium; and (3) the cross-sectional area of the medium.

Mathematical analyses of groundwater conditions, specifically the physical parameters which control subsurface fluid dynamics, require the availability of precise information about fluid pressure. This information is generally obtained from a pumping test. In a pumping test, a central pumping well and one or more observation boreholes are drilled at points some distance from the pumping well. Each borehole, also known as a piezometer, is a relatively small diameter (about 5 to 30 cm) hole which extends down into the earth to the water-bearing formation. The borehole may be lined with a casing or partially unlined depending upon the geologic material. After carefully monitoring the water levels in the boreholes for a period sufficient to determine their long-term temporal behavior, the pumping well is turned on and a specified discharge is maintained for a predetermined period of time. While the duration of pumping varies with the particular physical situation encountered, the test normally extends for at least several hours and sometimes extends for a week or longer. From the instant pumping begins, the water level changes in the observation boreholes are carefully monitored. Water level changes are directly related to pressure changes because of fresh water's uniform density. The drop in fluid pressure in the aquifer resulting from the pumping yields data which is then plotted as a function of distance from the pumping well and time after commencement of the pumping. Other things being equal, the greater the pressure drop observed in the borehole, the more resistance to flow in the water-bearing formation.

A variety of devices have been disclosed for measuring borehole groundwater levels during pumping tests, in particular, and for measuring fluid levels, in general. These devices generally fall within one of four categories: (1) tape measures; (2) mechanical floats; (3) immersion-conductivity sensors; and (4) ultrasonic devices. Tape measures are used by either extending them to the fluid level and observing the reading on the tape or by dipping them into the fluid, retracting them, and observing the fluid on the tape itself (much as is done with an automobile dipstick). The limitations of the use of tape measures in boreholes are obvious. First of all, the tape must be extended and then retracted for each reading unless the groundwater level is very close to the surface and, secondly, the tape method is incapable of accurately measuring fluid levels when the level is fluctuating rapidly, as groundwater levels usually do during the early, critical stages of a pumping test.

Floats move up and down with the fluid level and are generally connected mechanically to an indicator at the surface. A strip chart indicator moves with time to produce a recording of time and fluid level. Such a recording may be suitable for measuring relatively large changes in level over relatively long periods of time, but is of little utility in measuring small changes over short periods of time. Floats, like tape measures, are generally incapable of accurately measuring fluid levels which fluctuate rapidly. Floats are also prone to mechanical failure when left unattended.

Immersion-conductivity sensors are generally part of a probe which is lowered into a well. The sensor contains an electrical circuit which is triggered by the shunting effect of the conductive liquid when the probe reaches the fluid. An operator at the surface receives the signal and reads the footage indicator on the calibrated cable reel to determine fluid level. A variation of this type of device is disclosed in Fasching, U.S. Pat. No. 4,523,465, issued June 18, 1985, where the probe sends an acoustic signal, rather than an electrical signal, up the well when the fluid is contacted. The use of immersion-conductivity sensors requires an operator to raise or lower the probe for each reading and is a relatively slow and cumbersome process.

Ultrasonic devices of various types have been used for many years to determine fluid levels in wells. The devices generally operate by sending an ultrasonic signal from ground level down the full depth of the well and then recording the signal reflected upward from the fluid surface. If the speed of sound were constant, distance could be determined by merely measuring the elapsed time from the transmission to the receipt of the reflected signal. However, the speed of sound is a function of temperature, pressure, and the composition of the medium through which it travels. The variation in speed of sound, coupled with the large distances involved (fluid levels in wells are often 100 or more meters below the surface), requires some type of calibration to be used.

For example, Ritzmann, U.S. Pat. No. 2,232,476, issued Feb. 18, 1941, discloses the use of an ultrasonic device for measuring fluid level in a well having a casing and tubing. The distance to the fluid is calibrated by noting the number of reflections from the tubing collars, which generally occur about every 30 feet. Godbey, U.S. Pat. No. 4,318,298, issued Mar. 9, 1982, discloses an ultrasonic device in which the acoustic pulse source is automatically actuated at predetermined times, and the depth to the liquid level and the time are automatically recorded to produce a record of time and liquid depth which can extend over a period of several days. The Godbey device is calibrated by using the known distances between tubing collars or by using the known depth of the fluid at a given point in time. The device allegedly enables variations in the fluid depth of only a few feet to be observed without any interpretative errors. However, the Ritzmann and Godbey devices require prior knowledge of the well's construction and such information is often unavailable.

Ultrasonic devices have also been disclosed for measuring fluid levels in tanks and other large vessels. Some of these devices employ a fixed hollow cylinder extending from above to below the surface of the fluid. In some devices, the cylinder is used as a wave guide (the sonic pulses are transmitted through the cylinder itself) while in other devices the cylinder is used to contain the sonic pulses which move through the fluid within the cylinder. The devices employ different calibration techniques. For example, Turner, U.S. Pat. No. 2,713,263, issued July 19, 1955, employs radial slots on the outside of the cylinder and Tomioka, U.S. Pat. No. 3,394,589, issued July 30, 1968, employs reflector elements inserted at given distances in the cylinder. Willis, U.S. Pat. No. 3,834,233, issued Sept. 10, 1984, employs a second receiver which is positioned a fixed distance from the transmitter-receiver. Shuler, U.S. Pat. No. 4,090,407, issued May 23, 1978, and Austin, U.S. Pat. No. 4,170,765, issued Oct. 9, 1979, disclose cylinders having one calibration target a fixed distance from the ultrasonic transmitter-receiver.

In contrast to the above devices which measure the level of groundwater (from which pressure is then derived), there are other devices which apparently measure pressure directly. Such a device is disclosed in McKee, U.S. Pat. No. 4,461,172, issued July 24, 1984, as being useful in generating data for a drawdown test.

The importance of groundwater-level-measuring devices (and the data they obtain) to geohydrologists cannot be overstated. The precision and frequency with which changes in groundwater pressure are made determines the accuracy and value of all subsequent calculations based upon the pumping test. Accordingly, the persons conducting pumping tests and those using the test results would like to be able to measure with extreme accuracy very small changes in groundwater pressure over very short periods of time. For example, an apparatus which could accurately measure groundwater level changes of only about 2 mm (which corresponds to a change in fluid pressure in the aquifer of about 0.0002 atm), could make and record such measurements about every second, and could do so without site specific calibrations would be a tremendous advance over the devices and methods currently in use.

SUMMARY OF THE INVENTION

The object of this invention is to provide an improved apparatus and method of measuring changes in groundwater pressure in a borehole. A more particular object of this invention is to provide an apparatus and method of measuring small changes in groundwater pressure at adjustable time intervals.

We have discovered an apparatus for measuring changes in groundwater pressure in a borehole. The apparatus comprises: (a) a probe comprising: a hollow tube having a smooth interior surface, an outside diameter of about 5 to 30 cm, and a length of about 0.5 to 10 m; an ultrasonic transmitter located at or near the top of the tube which emits ultrasonic waves at adjustable time intervals down the interior of the tube where they reflect off the groundwater; and an ultrasonic receiver located at or near the top of the tube which receives and registers the ultrasonic waves reflected from the groundwater; (b) a means to raise and lower the probe so the tube is partially submerged in the groundwater; (c) a means to control the emission of ultrasonic waves by the ultrasonic transmitter; (d) a means to compute the time interval from emission of the ultrasonic wave to receipt of the reflected ultrasonic wave and to convert the time into a distance or pressure measurement; and (e) a means to store or transmit the data.

We have also discovered a method of measuring changes in groundwater pressure in a borehole. The method comprises the use of the apparatus described above.

We have further discovered a method of determining geohydrologic parameters from a pumping test, the method comprising: (a) withdrawing groundwater from a pumping well at a constant rate; and (b) observing the change in groundwater pressure in a borehole in response to the withdrawal of groundwater from the pumping well with the use of the apparatus described above.

The apparatus and method of this invention provide a number of advantages over devices and methods currently in use. First of all, a change in groundwater pressure of about 0.0002 atm (which corresponds to a change in groundwater level of about 2 mm) can be precisely measured. This represents an improvement in accuracy of one to several orders of magnitude over existing devices and methods. Secondly, groundwater pressure measurements can be made at time intervals which are virtually-infinitely adjustable. For example, the time intervals can be adjusted from about one second to hours or even days. Thirdly, once the apparatus is in place, it functions without moving parts and without the need for the presence of a human operator. Accordingly, the apparatus can provide a virtually continuous curve of groundwater pressure variations over a time span which is limited, if at all, only by the life of the electrical power source (e.g., battery or generator). Finally, there is no need to calibrate the apparatus for each specific site where it is used.

DETAILED DESCRIPTION OF THE INVENTION

Figure 1:
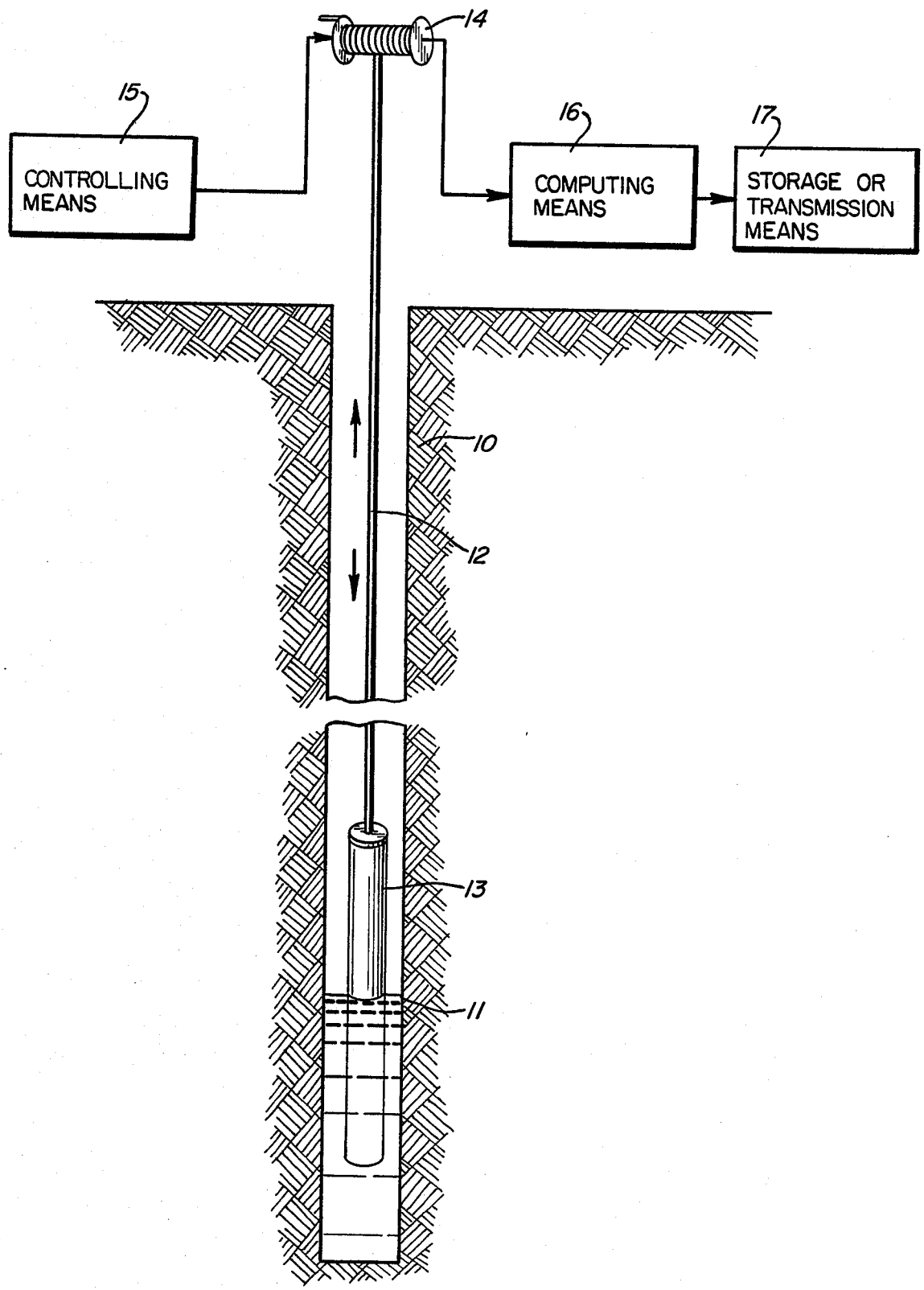
FIG. 1 is a sectional view of a borehole showing a simplified representation of the apparatus of this invention.

This invention is best understood by reference to the drawing. FIG. 1 is a sectional view of a borehole 10 extending an unspecified depth to an aquifer (not shown) under the Earth's surface. Groundwater from the aquifer rises in the borehole (due to fluid pressure in the aquifer) to a level 11. The borehole is one of several in the vicinity of a pumping well. The borehole itself is conventional and is not critical to this invention. The borehole may be lined with a casing or largely unlined depending upon the geologic material. In particular, casing is sometimes not necessary when the geologic material has sufficient integrity to prevent collapse, as in the case with some rock formations. The diameter of the borehole varies from about 5 to 50 cm.

Suspended in the borehole by a cable 12 is a probe 13 which is positioned such that it is partially, but not completely, submerged in the groundwater. The probe is raised or lowered with a winch 14 or other suitable means and set in a fixed position. The winch is shown merely suspended over the borehole for simplicity while in practice it is supported by a tripod or other supporting means. The probe includes an ultrasonic transmitter and receiver located at or near the top of a hollow tube. The tube has one or more openings in its bottom and one or more openings in its top so that the fluid level inside the tube is the same as the fluid level outside the tube. Ultrasonic waves from the transmitter are emitted, when instructed by the controlling means 15, down the gas inside the tube and are reflected by the fluid up to the receiver. The receipt of the reflected wave is transmitted to the computing means 16, which, like the controlling means, is represented as a "black box" in FIG. 1. The computing means computes the time interval from emission of the ultrasonic wave to receipt of the reflected wave and converts the time into a distance, or fluid pressure, measurement. Data concerning the distance or pressure measurements as a function of time are stored or transmitted by the storage or transmission means 17, which also is represented as a "black box".

One of the primary purposes of the cable is to support the probe and it is constructed of any suitable material. When conducting a pumping test, the primary interest is in changes in groundwater pressure rather than the actual depth of the groundwater. However, if the actual groundwater depth is desired, a distance-calibrated cable is conveniently employed. The cable also generally performs the second purpose of conveying electrical signals to and from the ultrasonic transmitter and receiver. A multifilament electrical cable designed primarily for this latter purpose may have sufficient strength to support the probe and thus eliminate the need for a separate cable. On the other hand, the transmission of information to and from the ultrasonic transmitter and receiver may be accomplished by fiber optics, radiofrequency, or ultrasonic means and in such situations a weight-supporting cable is generally necessary.

The primary purpose of the hollow tube is to provide as smooth a surface as possible for the ultrasonic waves, thereby reducing or eliminating sidewall interferences. Unlike many prior art devices which intentionally contain protrusions or indentations for calibration purposes, the tube of this invention seeks to minimize any reflection other than that from the groundwater. The tube is made of a material which is smooth, durable, and does not deteriorate in use. Various metals and plastics are suitable, but the preferred material is aluminum because of its strength, light weight, and relatively low cost. If the tube is made of more than one piece of material, the joints are treated so as to minimize or eliminate ultrasonic reflections.

As mentioned earlier, the tube has at least one opening in its top and one opening in its bottom to let liquid and gas move freely in and out of the probe. This ensures that the groundwater level inside the tube is the same as the level outside the tube. The hole or holes in the top are positioned above the ultrasonic transmitter so they do not cause reflections. The outside diameter of the tube is generally about 5 to 30 cm. The minimum diameter is generally limited by the size of the ultrasonic transmitter and receiver while the maximum diameter is generally limited by economics and the diameter of the borehole. The length of the probe is generally about 0.5 to 10 m and is chosen so that the probe remains partially submerged during the period of time water level measurements are taken. If little variation in water level is expected, a short probe may be used. Conversely, a long probe is needed if large variations are expected. The maximum length of the tube is limited only by the strength of the ultrasonic signal.

The ultrasonic transmitter is located at or near the top of the tube. It emits ultrasonic waves at adjustable time intervals down the interior of the tube. The ultrasonic receiver is also mounted at or near the top of the tube. It receives and registers the receipt of the ultrasonic wave reflected from the groundwater inside the tube. The transmitter and receiver may be separate units or they may be combined into a single unit. A preferred combined transmitter and receiver is the Type SN 28827 Sonar Ranging Module which is a commercial product of Texas Instruments, Incorporated of Dallas, Tex.

Associated with the probe and the cable is the equipment which controls the probe, computes the groundwater pressure data, and then stores or transmits the data. The equipment generally includes a power source, computer, software, oscillator, event counter, and elapsed time indicator. Such equipment is conventional. The three main functions of the equipment (control, computation, and storage or transmission) are described in more detail below.

The controlling means instructs the ultrasonic transmitter to emit an ultrasonic wave and also instructs the event counter to begin counting. These instructions can be given manually by, for example, pressing a button, or they can be given automatically at fixed intervals. The time intervals are virtually-infinitely adjustable: The intervals can be adjusted from about one second to hours or even days.

The computing means obtains a signal from the ultrasonic receiver when the reflected ultrasonic wave is received. The computing means then notes the count on the event counter and converts the count into a distance or pressure measurement. Variations in temperature, pressure, or gas composition in the borehole are not a problem because the distances travelled by the ultrasonic wave are relatively small (double the length of the tube at most and because the data desired are changes in groundwater pressure (so there is negligible error if, for example, all the measurements are 5 percent greater than actual). When the ultrasonic waves are generated automatically at fixed intervals, each measurement of groundwater level or pressure is obtained as a function of the elapsed time since automatic operation was begun.

The data generated by the computing unit can be put into usable form in many different ways. For example, the data can be stored or printed on site, or transmitted to a different location for use.

The primary advantages of the apparatus of this invention, and its use, are probably the great increase in accuracy and frequency of measurements when compared with existing devices and methods. Changes in groundwater pressure of about 0.0002 atm are accurately measured at time intervals which may be as short as one second. The data generated from this apparatus is a tremendous help to geohydrologists who employ pumping tests to generate information on the physical parameters which control subsurface fluid dynamics. The apparatus functions without moving parts and without the necessity of a human operator being present. Once the apparatus is in place, it can provide a virtually continuous curve of groundwater pressure variations over a time span which is limited, if at all, only by the life of its electrical power source. Accordingly, the apparatus is ideal for use in remote locations and for long-term unmanned observations.

We claim:

1. An apparatus for measuring changes in groundwater pressure in a borehole, the apparatus comprising:
    (a) a probe comprising: a hollow tube having a smooth interior surface, an outside diameter of about 5 to 30 cm, and a length of about 0.5 to 10 m; an ultrasonic transmitter located at or near the top of the tube which emits ultrasonic waves at adjustable time intervals down the interior of the tube where the waves reflect off the groundwater; and an ultrasonic receiver located at or near the top of the tube which receives and registers the ultrasonic waves reflected from the groundwater;
    (b) a means to raise and lower the probe so the tube is partially submerged in the groundwater;
    (c) a means to control the emission of ultrasonic waves by the ultrasonic transmitter;
    (d) a means to compute the time interval from emission of the ultrasonic wave to receipt of the reflected ultrasonic wave and to convert the time into a distance or pressure measurement; and
    (e) a means to store or transmit the data.

2. The apparatus of claim 1 wherein the hollow tube contains at least one opening in its top and at least one opening in its bottom so that the groundwater level inside the tube is the same as the groundwater level outside the tube.

3. A method of determining geohydrologic parameters from a pumping test, the method comprising:
    (a) withdrawing groundwater from a pumping well at a constant rate; and
    (b) measuring the change in groundwater lever to determine the change in groundwater pressure in a borehole in response to the withdrawal of groundwater from the pumping well with the use of an apparatus comprising:
        (i) a probe comprising: a hollow tube having a smooth interior surface, an outside diameter of about 5 to 30 cm, and a length of about 0.5 to 10 m; an ultrasonic transmitter located at or near the top of the tube which emits ultrasonic waves at adjustable time intervals down the interior of the tube where the waves reflect off the groundwater; and an ultrasonic receiver located at or near the top of the tube which receives and registers the ultrasonic waves reflected from the groundwater;
        (ii) a means to raise and lower the probe so the tube is partially submerged in the groundwater;
        (iii) a means to control the emission of ultrasonic waves by the ultrasonic transmitter;
        (iv) a means to compute the time interval from emission of the ultrasonic wave to receipt of the reflected ultrasonic wave and to convert the time into a distance or pressure measurement; and
        (v) a means to store or transmit the data.

* * * * *